(12) United States Patent
Hilden et al.

(10) Patent No.: US 7,086,629 B2
(45) Date of Patent: *Aug. 8, 2006

(54) SEVERANCE OF POLYCARBONATES AND POLYCARBONATE LAMINATES WITH LINEAR SHAPED CHARGE

(75) Inventors: Lynn G. Hilden, Hollister, CA (US); Douglas D. Menzel, Hollister, CA (US); Raymond D. Weiss, Gilroy, CA (US)

(73) Assignee: McCormick Selph, Inc., Hollister, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/387,442

(22) Filed: Mar. 14, 2003

(65) Prior Publication Data

US 2003/0189133 A1    Oct. 9, 2003

Related U.S. Application Data

(63) Continuation of application No. 09/470,222, filed on Dec. 22, 1999, now Pat. No. 6,609,464.

(51) Int. Cl.
*B64C 1/32* (2006.01)

(52) U.S. Cl. ............................. 244/122 AF; 102/306; 102/307; 89/1.14

(58) Field of Classification Search ............ 102/301, 102/303, 306, 307; 89/1.14; 244/122 AF
See application file for complete search history.

(56) References Cited

U.S. PATENT DOCUMENTS

| | | | |
|---|---|---|---|
| 3,547,382 A | | 12/1970 | Stanley et al. |
| 3,670,998 A | * | 6/1972 | Charleville et al. ......... 244/121 |
| 3,778,010 A | | 12/1973 | Potts et al. |
| 3,806,069 A | * | 4/1974 | Galton .................. 244/122 AF |
| 3,885,761 A | | 5/1975 | Pendergast et al. |

(Continued)

OTHER PUBLICATIONS

'A Systems Engineering Design Guide To Aircraft Explosive Canopy Fracturing', Robert William Ingham, Dec. 1993, Teledyne Ryan Aeronautical, McCormick Selph Ordinance.

(Continued)

*Primary Examiner*—Jeffrey L. Gellner
*Assistant Examiner*—Timothy D. Collins
(74) *Attorney, Agent, or Firm*—Robert E. Bushnell, Esq.

(57) ABSTRACT

The present invention involve a method for severance of materials made of polycarbonate, polycarbonate laminate and aciylic/polycarbonate laminate, a canopy fracturing system and a conopy having the canopy fracturing system.

The present invention utilizes a linear shaped explosive charge placed at a predetermined distance or stand off from the polycarbonate material to be severed. The coreload of the charge is determined such that the minimum coreload necessary to effect severance of a given thickness of polycarbonate material is utilized. A retainer is placed around the charge and affixed to the material such that the charge is at the proper stand off from the material. The retainer surrounds the back side of the charges but leaves open space between the charge and the material to be severed. Upon detonation, the charge creates an explosive cutting force, or jet blast, that severs the polycarbonate material. Also, provided are methods for intersecting explosive charges about a pattern to be severed and methods for transferring detonation between such intersecting explosive charges.

33 Claims, 9 Drawing Sheets

U.S. PATENT DOCUMENTS

| | | |
|---|---|---|
| 4,275,858 A | 6/1981 | Bolton et al. |
| 4,301,707 A | 11/1981 | Schimmel et al. |
| 4,407,468 A | 10/1983 | Bement et al. |
| 4,649,825 A | 3/1987 | Quick et al. |
| 5,170,004 A * | 12/1992 | Garrison .................... 89/1.14 |
| 5,780,763 A | 7/1998 | Schimmel et al. |
| 5,814,758 A | 9/1998 | Leidel |
| 5,827,995 A * | 10/1998 | Graham ...................... 102/307 |
| 5,954,296 A * | 9/1999 | Jahsman et al. ............ 244/121 |
| 6,435,095 B1 * | 8/2002 | Menzel et al. ........... 102/275.7 |
| 2002/0166924 A1 * | 11/2002 | Fahey ........................ 244/121 |

OTHER PUBLICATIONS

Written Opinion in corresponding International Application No. PCT/US00/35057 dated Dec. 21, 2001.

International Preliminary Examination Report in corresponding International Application No. PCT/US00/35057 dated May 22, 2002.

* cited by examiner

SEVERANCE OF POLYCARBONATES AND POLYCARBONATE LAMINATES WITH LINEAR SHAPED CHARGE

This continuation application makes reference to, incorporates the same herein, and claims all benefits including under 35 U.S.C. § 121 from a co-pending application entitled SEVERANCE OF POLYCARBONATES AND POLYCARBONATE LAMINATES WITH LINEAR SHAPED CHARGE filed in the United States Patent & Trademark Office on the $22^{th}$ of Dec. 1999 and there duly assigned Ser. No. 09/470,222, now U.S. Pat. No. 6,609,464 B1 issued on the $26^{th}$ of Aug. 2003.

FIELD OF THE INVENTION

The present invention relates to severing materials, such as an aircraft canopy made from polycarbonate, polycarbonate laminate or acrylic/polycarbonate laminate, with an explosive charge.

BACKGROUND

Most military aircraft contain an ejection seat that allows the pilot to escape the aircraft while in flight. When an ejection seat is jettisoned from the cockpit of an aircraft, it must pass through the region occupied by the transparent canopy of the aircraft. In instances where the canopy is not jettisoned prior to the ejection seat firing, the ejection seat must be capable of blasting entirely through the canopy. To reduce the risks to the pilot or other aircraft occupant attendant to forcing the-ejection seat through the canopy, canopy fracture systems have been provided to fracture the canopy and better clear a path for the ejecting occupant so as to minimize bodily impact with the canopy.

Canopy fracture systems have been effective at removing portions of canopies that are made from fragilizing materials, such as cast or stretched acrylic. Fragilizing materials are those that may be caused to shatter into a significant number of pieces on application of sufficient pressure or explosive force. These systems utilize a mild detonating charge (MDC) or linear shaped charge (LSC) placed on, in or near the transparency which, upon detonation, creates shock waves that fracture the canopy. With fragilizing canopies, such as those made from cast or even stretched acrylic, it is not necessary to fully sever the material in order to defeat its structural integrity.

Many high performance aircraft utilize polycarbonate in their canopies instead of acrylic. Polycarbonate is a nonfragilizing material, meaning that it does not shatter on application of explosive force. With polycarbonate, it is absolutely necessary to fully sever the material because fracturing to complete the break is very unreliable. Because polycarbonate has a relatively low melt point and because cutting the material generates considerable heat there also exists a potential for resealing behind the cut if the severance is not complete.

U.S. Pat. No. 5,170,004 teaches an explosive device wherein a nearly incompressible transmitting medium is placed between the explosive device and an aircraft canopy. The function of the transmitting medium is to transmit the shock wave, produced upon detonation, to the canopy with a minimum of dissipation. This device is effective on fragilizing canopies but has not been successful with thicker non-fragilizing canopies made from monolithic polycarbonate, polycarbonate laminates or acrylic/polycarbonate laminates.

U.S. Pat. No. 5,780,763 teaches a method of fracture wherein explosive cords are placed in parallel grooves on the tipper surface of a canopy and simultaneously detonated to create overlapping shock waves. This method is apparently capable of breaking a 0.75 inch thick polycarbonate in the laboratory at ambient temperature or below, but is unreliable at elevated temperatures on the order of 165° Fahrenheit or above. This method, however, requires two charges, grooves to be cut in the material and also utilizes shock waves which are not reliable on polycarbonate materials.

U.S. Pat. No. 5,954,296 also relates to an aircraft canopy fracture system. The 296 patent claims a canopy with a severable region shaped so as to inhibit passage of the severable region back through the canopy after severance. The 296 patent also refers to the use of a LSC to sever a polycarbonate canopy.

All documents, including other patents and references, referred to in this document are hereby incorporated by reference in their entirety, although no documents are admitted to render any of the claims unpatentable either alone or in combination with any other references known by the applicant.

The prior art also does not adequately deal with the problems of providing for severance around the corners of the severable portion of the target or for routing a charge over the top of another charge.

It is therefore an object of this invention to provide a severance method which severs materials such as polycarbonate, polycarbonate laminates or acrylic/polycarbonate laminates that cannot be severed by existing methods except by use of excessive amounts of explosive charge or by placing the charge inside the material to be fractured, thereby degrading the material's structural integrity.

It is another object of this invention to provide a severance method that allows for a minimum amount of explosive charge to sever a given thickness of material at high and low temperature extremes.

It is further an object of this invention to provide a severance method that allows for severance around corners and through intersecting portions of the explosive charge.

SUMMARY OF THE INVENTION

The present invention is a method for severing a non-fragilizing material such as polycarbonate with a linear shaped charge ("LSC"). Previous methods of polycarbonate, polycarbonate laminate or acrylic/polycarbonate laminate severance were either ineffective, or required imbedding explosive charges into the canopy itself. The prior art relies on the use of shock waves to fracture aircraft canopies. These methods, however, are not effective or reliable on canopies made from non-fragilizing materials such as polycarbonate, polycarbonate laminate or acrylic/polycarbonate laminate. The present invention discloses a method of using the cutting face of the explosive charges to sever a material such as polycarbonate, instead of relying on unreliable shock waves. Because the severance method of this invention is more effective and more reliable than previous severance methods, a lesser amount of explosive charge is required to effect target severance. In the case of a polycarbonate aircraft canopy target, the present invention's severance method provides pilots with a lower exposure to explosion back blast and noise.

An LSC is placed in proximity to the material to be severed at a distance sufficient to generate an explosive cutting face or "jet" adequate for cutting the target thickness.

The LSC is held in place and at the sufficient distance by a retainer that surrounds the back of the charge. The retainer is adhered or attached to the target, again maintaining the appropriate distance between the charge and the target. Upon detonation, the charge severs the target. The charge and retainer may be tooled to provide for effective severance with minimum explosive force around corners. The present invention also provides for various methods of charge intersection, crossover and detonation transfer.

DETAILED DESCRIPTION

Figure 1:
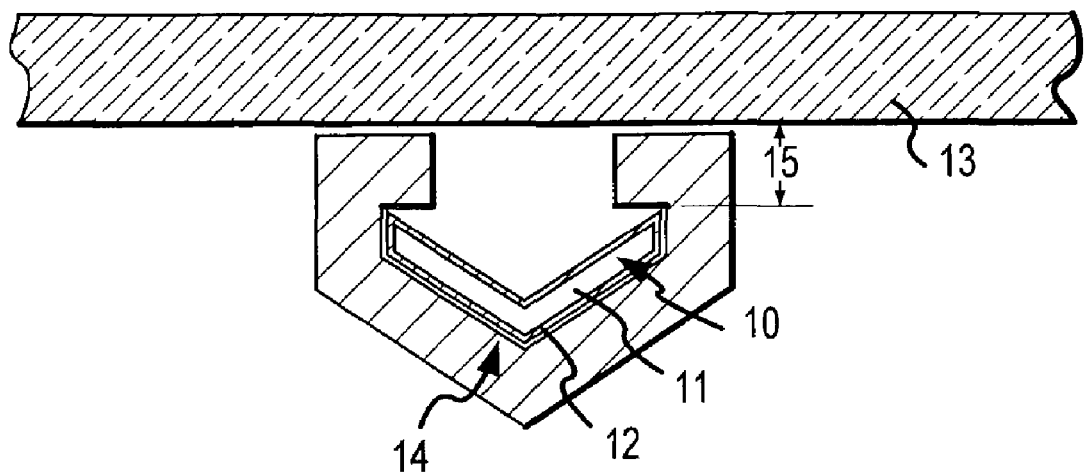
FIG. 1 is a side view of an explosive charge of the present invention attached to a target that is to be severed.

Referring to the drawings by reference numbers, FIG. 1 shows a linear shaped charge ("LSC") 10 of the present invention in position on the target. The LSC is of a strength sufficient to sever a target, such as an aircraft canopy transparency, made from polycarbonate, polycarbonate laminate or acrylic/polycarbonate laminate.

Figure 2:
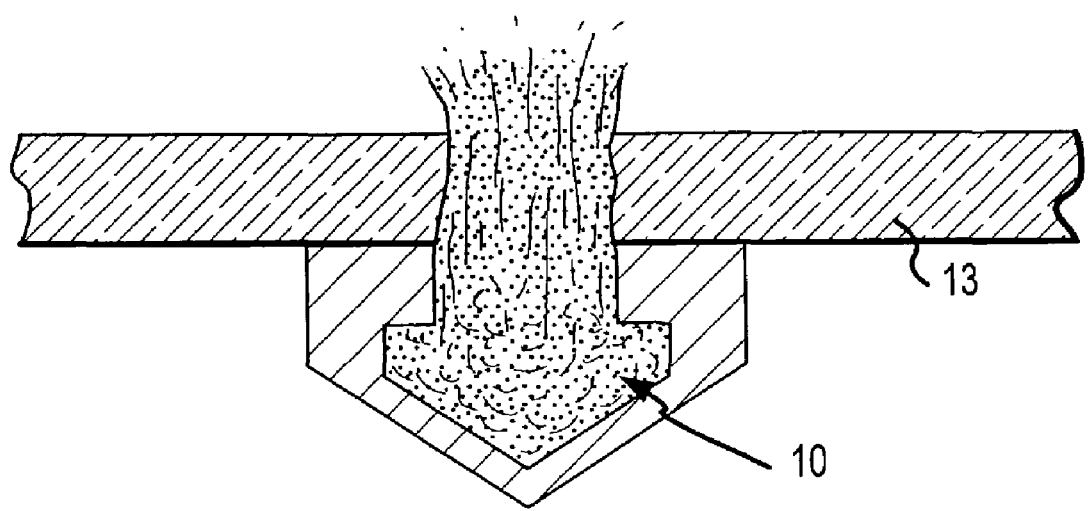
FIG. 2 is a side view of an explosive charge of the present invention after detonation severing the target material.
Figure 3A:
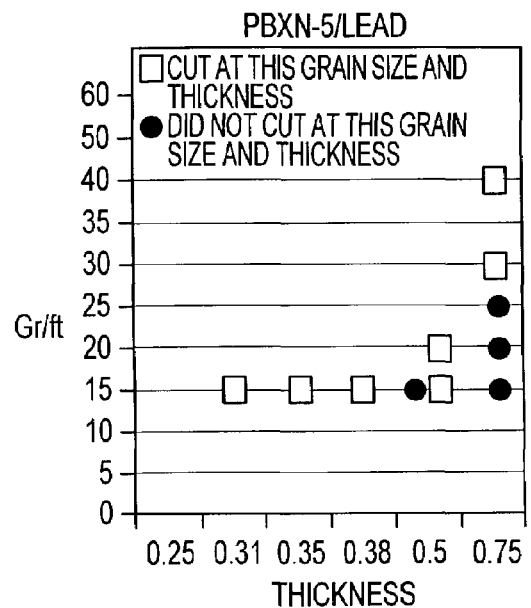
FIGS. 3a–d are tables showing performance test results of varying grain sizes of various LSCs on polycarbonates of varying thickness.
Figure 3B:
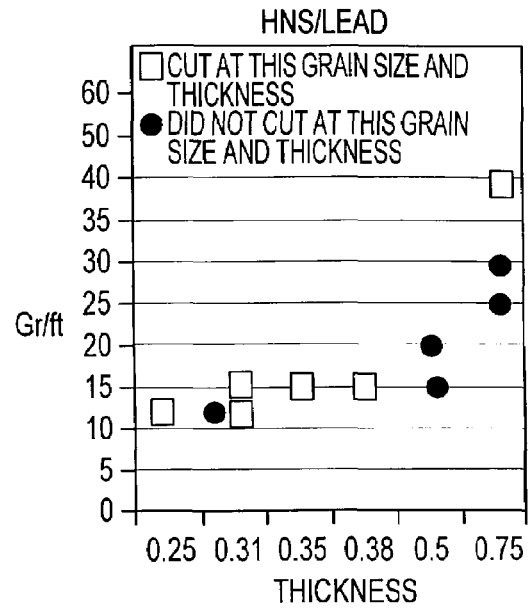
Figure 3C:
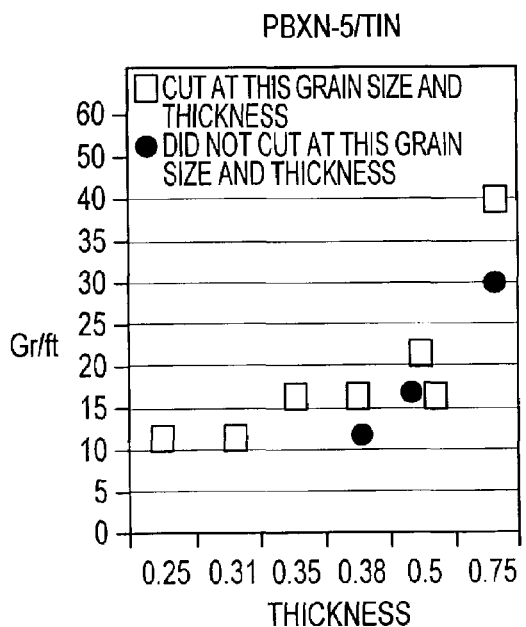
Figure 3D:
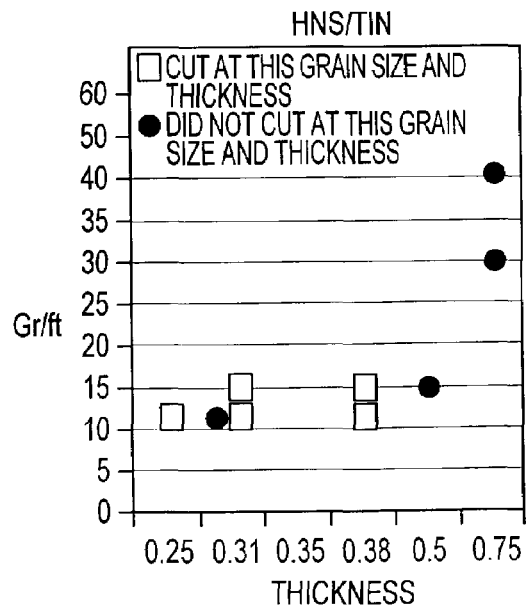

The LSC 10 includes an explosive core 11 and a sheath 12. The best results are obtained when the LSC is shaped like a chevron with the opening facing and parallel to the target 13. There is open space between the LSC and the target. The LSC is surrounded by a retainer 14 that is attached to the target by some form of adhesive. The retainer attaches the LSC to the target such that the LSC is offset from the target by a distance 15 that allows the LSC to generate an explosive blast of sufficient strength to sever the target. FIG. 2 shows the present invention at the moment of explosion severing a target.

In a preferred embodiment the retainer is made from rubber and attached to the canopy with an epoxy or other adhesive. The retainer not only serves to hold the LSC in place at an appropriate distance from the canopy, it also acts to attenuate the back blast and noise from the explosion to protect the aircrew (in the case of a canopy target). The retainer may also be made from a other type rubber products, an epoxy composite or other compounds and still achieve satisfactory results.

LSC sheathing is made of metal, typically tin, lead, aluminum, silver or copper. For severance of polycarbonates, tin, lead, and silver are preferable, but silver is rarely used due to high material costs. Testing was performed using PBXN-SILead, PBXN-5/Tin, FINS/Lead and FINS/Tin LSC of varying coreloads. Some of those test results are set forth in FIGS. 3a–3d. This testing revealed that a lead sheath is slightly more effective for severing polycarbonates than a tin sheath. Both are effective, however, and because of the hazards of working with lead, a tin sheath is the preferred embodiment. A tin sheath is slightly more effective than a lead sheath in severing aluminum. Testing also determined that PBXN-5 powder is superior to FINS powder.

Because of the lack of success with previous canopy fracturing and severance methods in polycarbonate canopies, a great deal of testing was performed to determine the proper LSC coreload and stand off necessary to sever a set thickness of polycarbonate. In the present invention the coreload and stand-off necessary to sever polycarbonates of varying thickness is disclosed. As would be expected, the thicker the polycarbonate to be severed, the greater the coreload required. The LSC is more effective if setoff a certain distance from the target. A tabular representation of the test results achieved on varying polycarbonate thicknesses with varying LSC coreload, powder sheathing, back ups and stand-off is set forth below:

| TEST # | SOURCE | IDENTIFICATION INFORMATION | NOTES | Back Up | Thickness | Penetration |
|---|---|---|---|---|---|---|
| 1 | UDRI | Dow-Calibre 300-6, ¾", #4 | 12 gr/ft HNS/Lead, RTV, No Stand-Off(SO), Parallel Beam, Broke | retainer | 0.75 | .045/broke |
| 2 | UDRI | Dow-Calibre 300-6, ¾", #2 | 20 gr/ft RDX/Lead, RTV, No SO, Parrallel Beam, Broke | retainer | 0.75 | broke |
| 3 | UDRI | Dow-Calibre 300-6, ¾", #9 | 12 gr/ft HNS/Lead, RTV, No SO, Bottom Clamped, .05 Imp., B-U | retainer | 0.75 | 0.05 |
| 4 | UDRI | Dow-Calibre 300-6, ¾", #12 | 21 gr/ft CH6/Al, 0.090 SO, 0.275 Penetration, Cracked Through | TMD | 0.75 | .15/break |
| 5 | UDRI | Dow-Calibre 300-6, ¾", #14 | 21 gr/ft CH6/Al, No SO, 0.180 Penetration, Some cracking | TMD | 0.75 | .180/break |

-continued

| TEST # | SOURCE | IDENTIFICATION INFORMATION | NOTES | Back Up | Thickness | Penetration |
|---|---|---|---|---|---|---|
| 6 | UDRI | Dow-Calibre 300-6, ¾", #15 | 21 gr/ft CH6/Al, No SO, RTV filled, Little Penetration | TMD | 0.75 | 0.075 |
| 8 | UDRI | Dow-Calibre 300-6, ¾", #3 | 40 gr/ft PBXN5/Lead, .180 SO, inside radius-straight, cut | rubber | 0.075 | broke |
| 33 | Texstar | Coated In C678, Out C992, 5/16" | 12 gr/ft, HNS/Tin, 0.125 SO, some pen, all melted, no cut | rubber | 0.312 | 0.19 |
| 34 | Texstar | Coated In C678, Out C992, 5/16" | 12 gr/ft, PBXN-5/Tin, 0.160 SO, Cut | rubber | 0.312 | cut |
| 35 | Texstar | Coated In C678, Out C992, 5/16" | 12 gr/ft, PBXN-5/Tin, .160 SO, 90° Angle, Cut except angle | paper | 0.312 | 0.3 |
| 36 | Texstar | Coated In C678, Out C992, 5/16" | 12 gr/ft, PBXN-5/Tin, .160 SO, unrestrained, Cut | paper | 0.312 | cut |
| 37 | Texstar | Coated In C678, Out C992, 5/16" | 12 gr/ft, HNS/Tin, 0.125 SO, Unrestrained, Cut | paper | 0.312 | cut |
| 38 | Texstar | Coated In C678, Out C992, 5/16" | 15 gr/ft, HNS/Tin, 0.125 SO, cut | rubber | 0.312 | cut |
| 39 | Texstar | Coated In C678, Out C992, 5/16" | 12 gr/ft, PBXN5/Tin, 360° sep test, cut & broke | rubber | 0.323 | cut |
| 49 | Texstar | Coated In C678, Out C992, ⅜" | 12 gr/ft, PBXN-5/Tin, 0.160 SO, Nearly Severed | paper | 0.375 | 0.18 |
| 50 | Texstar | Coated In C678, Out C992, ⅜" | 12 gr/ft, HNS/Tin, 0.125 SO, cut | rubber | 0.375 | cut |
| 51 | Texstar | Coated In C678, Out C992, ⅜" | 15 gr/ft, HNS/Tin, 0.125 SO, cut | rubber | 0.375 | cut |
| 52 | Texstar | Coated In C678, Out C992, ⅜" | 12 gr/ft, PBXN-5/Tin, 0.130 SO, remelted + D73 | rubber | 0.375 | cut |
| 53 | Texstar | Coated In C678, Out C992, ⅜" | 12 gr/ft, HNS/Lead, 0.130 SO, remelted | rubber | 0.375 | cut |
| 54 | Texstar | Coated In C678, Out C992, ⅜" | 15 gr/ft, PBXN5/Tin, .15 SO, 360° 2" R Bend-sep. test, cut except joint | rubber | 0.375 | not joint |
| 65 | Texstar | Coated In C678, Out C992, ½" | 15 gr/ft, PBXN-5/Tin, 0.160 SO, some penetration, mostly melted | paper | 0.5 | 0.35 |
| 66 | Texstar | Coated In C678, Out C992, ½" | 15 gr/ft, PBXN-5/Lead, 0.160 SO, melted but not severed | paper | 0.5 | 0.41 |
| 67 | Texstar | Coated In C678, Out C992, ½" | 15 gr/ft, PBXN-5/Lead, 0.160 SO, unrestrained, some pen, melted | paper | 0.5 | 0.41 |
| 68 | Texstar | Coated In C678, Out C992, ½" | 15 gr/ft, PBXN-5/Tin, 0.160 SO, unrestrained | paper | 0.5 | 0.445 |
| 69 | Texstar | Coated In C678, Out C992, ½" | 15 gr/ft, PBXN-5/Lead, 90 deg bend, 0.150 SO, close | paper | 0.5 | cut/not bend |
| 70 | Texstar | Coated In C678, Out C992, ½" | 15 gr/ft, PBXN-5/Tin, 90 deg bend, 0.150 SO, shattering, close | paper | 0.5 | cut/.36 |
| 71 | Texstar | Coated In C678, Out C992, ½" | 15 gr/ft, PBXN5/Lead, 200 deg F., 0.150 SO, remelted | rubber | 0.5 | cut/remelted |
| 72 | Texstar | Coated In C678, Out C992, ½" | 15 gr/ft, PBXN5/Tin, 200 deg F., 0.150 SO, unteth, hanging thread | paper? | 0.5 | cut |
| 73 | Texstar | Coated In C678, Out C992, ½" | 15 gr/ft, PBXN5/Lead, −65° F., 0.150 SO, cut | rubber | 0.5 | cut |
| 74 | Texstar | Coated In C678, Out C992, ½" | 15 gr/ft, PBXN5/Tin, −65° F., 0.150 SO, cut | rubber | 0.5 | cut |
| 75 | Texstar | Coated In C678, Out C992, ½" | 20 gr/ft, PBXN-5/Lead, unteth, cut | rubber | 0.5 | cut |
| 76 | Texstar | Coated In C678, Out C992, ½" | 20 gr/ft, PBXN-5/Tin, unteth, cut | rubber | 0.5 | cut |
| 77 | Texstar | Coated In C678, Out C992, ½" | 20 gr/ft, PBXN-5/Tin, unteth, some penetration, S curve, not cut | rubber | 0.5 | cut/.45 |
| 78 | | | 20 gr/ft, PBXN-5/Lead, .145 SO, "S"turn, not cut in bends | rubber | 0.55 | cut/.45 |
| 79 | Texstar | Coated In C678, Out C992, ½" | 15 gr/ft, PBXN-5/Tin, 90° turn, 0.145 SO, restrained, 2" radius | rubber | 0.5 | 0.32 |
| 80 | Texstar | Coated In C678, Out C992, ½" | 15 gr/ft, PBXN-5/Lead, 90° turn, 0.145 SO, restrained, 2" radius | rubber | 0.5 | cut/99% |
| 81 | Texstar | Coated In C678, Out C992, ¾" | 30 gr/ft, PBXN-5/Lead, unrestrained, .175 SO, cut | paper | 0.75 | cut |
| 82 | Texstar | Coated In C678, Out C992, ¾" | 30 gr/ft, PBXN-5/Tin, unrestrained, .175 SO, .540 pen, cracked | paper | 0.75 | 0.54 |
| 83 | Texstar | Coated In C678, Out C992, ¾" | 30 gr/ft, HNS/Lead, 0.150 SO, .480 pen, some cracking | paper | 0.75 | 0.48 |
| 84 | Texstar | Coated In C678, Out C992, ¾" | 30 gr/ft, HNS/Tin, 0.120 SO, unteth, .440 pen | rubber | 0.75 | 0.44 |
| 85 | Texstar | Coated In C678, Out C992, ¾" | 30 gr/ft, PBXN5/Lead, 0.150 SO, −70° F., Cut | rubber | 0.75 | cut |
| 86 | Texstar | Coated In C678, Out C992, ¾" | 30 gr/ft, PBXN5/Lead, 0.150 SO, 200° F., untethered, cut | rubber | 0.75 | cut |
| 87 | Texstar | Coated In C678, Out C992, ¾" | 30 gr/ft, PBXN-5/Lead, 0.182 SO, 200° F., restrained, cut | rubber | 0.75 | cut |
| 88 | Texstar | Coated In C678, Out C992, ¾" | 30 gr/ft, PBXN-5/Lead, 0.182 SO, 200° F., unrestrined, cut | rubber | 0.75 | cut |
| 105 | NSWC | MX2054-920415, 0.500 | .530 thick, 15 gr/ft PBXN5/Lead, .150 SO, Nearly severed | rubber | 0.53 | 0.5 |
| 106 | NSWC | MX2054-920415, 0.500 | .530 thick, 20 gr/ft PBXN5/Lead, .150 SO, 90° bend, cut | rubber | 0.53 | cut |
| 109 | Pilkington | 0.250 × 36 × 60 | 12 gr/ft, 815525-2 (Min/Max), RTV, No SO, No Cut, cracked thru | no SO | 0.25 | 0.12 |
| 110 | Pilkington | 0.250 × 36 × 60 | 12 gr/ft, 815525-2 (Min/Max), RTV, No SO, Scored, cut & melted | no SO | 0.25 | cut/melted |
| 111 | Pilkington | 0.250 × 36 × 60 | 12 gr/ft, 815525-2 (Min/Max), No SO, No cut | no SO | 0.25 | .05/cracking |
| 112 | Pilkington | 0.250 × 36 × 60 | 12 gr/ft, 815525-2 (Min/Max), No SO, No cut | no SO | 0.25 | .04/melting |
| 113 | Pilkington | 0.250 × 36 × 60 | 12 gr/ft, 815525-2 (Min/Max), 0.110 SO, Use CH 825252, Cut | rubber | 0.25 | cut |
| 114 | Pilkington | 0.250 × 36 × 60 | 12 gr/ft, 815525-2 (Min/Max), 0.110 SO, Use CH 825252, Cut | rubber | 0.25 | cut |
| 116 | Pilkington | 0.250 × 36 × 60 | 12 gr/ft, HNS/Tin, 0.110 SO, Use CH 825252, Cut | paper | 0.25 | cut |
| 118 | Pilkington | 0.250 × 36 × 60 | 12 gr/ft, PBXN-5/Tin, 0.110 SO, Use CH 825252(?), Cut | paper | 0.25 | cut |
| 119 | Pilkington | 0.250 × 36 × 60 | 12 gr/ft, HNS/Lead, 0.110 SO, 200° F., Cut | rubber | 0.25 | cut |
| 120 | Pilkington | 0.250 × 36 × 60 | 12 gr/ft, HNS/Lead, 0.110 SO, RTV Filled, Poor Performance | rubber | 0.25 | 0.025 |
| 125 | Pilkington | 0.312 × 36 × 60 | 12 gr/ft, HNS/Lead, 0.110 SO, No Cut | rubber | 0.312 | .28/pen |
| 126 | Pilkington | 0.312 × 36 × 60 | 12 gr/ft, HNS/Lead, 0.145 SO, No Cut | rubber | 0.312 | 0.22 |
| 127 | Pilkington | 0.312 × 36 × 60 | 15 gr/ft, HNS/Lead, 0.145 S.O., Cut | rubber | 0.312 | cut |
| 128 | Pilkington | 0.312 × 36 × 60 | 15 gr/ft, PBXN-5/Lead, 0.145 S.O., Cut | rubber | 0.312 | cut |

-continued

| TEST # | SOURCE | IDENTIFICATION INFORMATION | NOTES | Back Up | Thickness | Penetration |
|---|---|---|---|---|---|---|
| 129 | Pilkington | 0.312 × 36 × 60 | 12 gr/ft, PBXN-5/Tin, 0.110 SO, Use CH 825252, Cut but Remelted | paper | 0.312 | cut |
| 141 | Pilkington | 0.350 × 36 × 60 | 15 gr/ft, HNS/Lead, 0.145 S.O., Cut | rubber | 0.35 | cut |
| 142 | Pilkington | 0.350 × 35 × 60 | 15 gr/ft, PBXN-5/Lead, 0.145 S.O., Cut | rubber | 0.35 | cut |
| 143 | Pilkington | 0.350 × 36 × 60 | 15 gr/ft, PBXN-5/Tin, 0.145 S.O., Cut | paper | 0.35 | cut |
| 167 | Texstars | 0.310 Ply Laminate | 12 gr/ft PBXN5/Tin, .15 SO, Gap Test, Gap did not break | rubber | 0.312 | cut/not jnt |
| 173 | Sierracin | 0.375 Ply Laminate | 15 gr/ft HNSlLead, 0.145 SO, Cut | rubber | 0.375 | cut |
| 174 | Sierracin | 0.375 Ply Laminate | 15 gr/ft PBXN-5/Lead, 0.145 SO, Cut | rubber | 0.375 | cut |
| 175 | Sierracin | 0.375 Ply Laminate | 15 gr/ft PBXN-5/Tin, 0.145 SO, Cut | paper | 0.375 | cut |
| 176 | Texstars | 0.375 Ply Laminate | 12 gr/ft PBXN5/Tin, .070 SO, Untethered, butted joint, cut, not joint | rubber | 0.375 | cut/not jnt |
| 177 | Sierracin | 0.375 Ply Laminate | 12 gr/ft PBXN-5/Tin, 0.070 SO, Cut joint | rubber | 0.375 | cut jont |
| 178 | Sierracin | 0.375 Ply Laminate | 12 gr/ft PBXN-5/Tin, 0.150 SO, cut 1 end, .235 pen other end | rubber | 0.375 | 0.305 |
| 181 | Sierracin | 0.500 Ply Laminate | 15 gr/ft HNS/Lead, 0.145 SO, No Cut, .310 Penetration | rubber | 0.5 | 0.31 |
| 182 | Sierracin | 0.500 Ply Laminate | 15 gr/ft PBXN-5/Lead, 0.145 SO, Cut | rubber | 0.5 | cut |
| 183 | Sierracin | 0.500 Ply Laminate | 20 gr/ft HNS/Lead, 0.145 SO, No Cut, .450 Penetration | rubber | 0.5 | 0.45 |
| 184 | Sierracin | 0.500 Ply Laminate | 20 gr/ft PBXN-5/Lead, 0.145 SO, Cut | rubber | 0.5 | cut |
| 185 | Sierracin | 0.500 Ply Laminate | 15 gr/ft PBXN-5/Lead, 0.145 SO, Cut but remelted | rubber | 0.5 | cut |
| 186 | Sierracin | 0.500 Ply Laminate | 15 gr/ft PBXN-5/Lead, 0.145 SO, 200° F., Cut | rubber | 0.5 | cut |
| 187 | Sierracin | 0.500 Ply Laminate | 15 gr/ft PBXN-5/Lead, 0.145 SO, −65° F., Cut | rubber | 0.5 | cut |
| 188 | Sierracin | 0.500 Ply Laminate | 15 gr/ft PBXN-5/Tin, 0.145 SO, Cut but remelted | paper | 0.5 | cut |
| 189 | Sierracin | 0.750 Ply Laminate | 25 gr/ft HNS/Lead, 0.145 SO, No Cut, ~0.420 Penetration | rubber | 0.75 | 0.42 |
| 190 | Sierracin | 0.750 Ply Laminate | 30 gr/ft HNS/Lead, 0.145 SO, No Cut, ~0.450 Penetration | paper | 0.75 | 0.45 |
| 191 | Sierracin | 0.750 Ply Laminate | 20 gr/ft PBXN-5/Lead, 0.145 SO, No Cut, ~0.450 Penetration | rubber | 0.75 | 0.4 |
| 192 | Sierracin | 0.750 Ply Laminate | 25 gr/ft PBXN-5/Lead, 0.145 SO, No Cut, ~0.550 Penetration | rubber | 0.75 | 0.55 |
| 193 | Sierracin | 0.750 Ply Laminate | 30 gr/ft PBXN-5/Lead, 0.165 SO, Cut | paper | 0.75 | cut |
| 194 | Sierracin | 0.750 Ply Laminate | 30 gr/ft PBXN-5/Tin, 0.145 SO, No Cut, ~0.550 Penetration | paper | 0.75 | 0.55 |
| 195 | Sierracin | 0,750 Ply Laminate | 15 gr/ft PBXN-5/Lead, 0.145 SO, ~0.440 Penetration | paper | 0.75 | 0.44 |
| 196 | Sierracin | 0.750 Ply Laminate | 30 gr/ft PBXN-5/Lead, 0.165 SO, Cut Partially | paper | 0.75 | 0.7 |
| 197 | NSWC-IH | 0.500 D910108-06 | 15 gr/ft PBXN-5/Lead, 0.145 SO, 90 deg, 1 of 90's not cut | none | 0.5 | 0.46 |
| 198 | NSWC-IH | 0.500 D910108-06 | 15 gr/ft PBXN-5/Tin, 0.145 SO, 90 deg, some pen. not cut | none | 0.5 | 0.4 |
| 199 | NSWC-IH | 0.500 | 15 gr/ft, PBXN-5/Tin, 0.145 SO, some pen, all melted, no cut | paper | 0.5 | 0.42 |
| 200 | NSWC-IH | 0.500 | 15 gr/ft, PBXN-5/Lead, 0.145 SO, remelted | paper | 0.5 | .46/cut |
| 205 | Sierracin | 0.750 | 30 gr/ft, PBXN-5/Tin, 0275 SO, ~.550 Pen., Crack & Melt, No Cut | paper | 0.75 | 0.55 |
| 206 | Sierracin | 0.750 | 30 gr/ft, PBXN-5/Lead, 0.250 SO, ~.650 to Cut, No Sep. remelted | paper | 0.75 | .675/cut |
| 207 | WPAFB | 0.750 | 40 gr/ft, HNS/Lead, 0.150 SO, cut, unrestrained | rubber | 0.75 | cut |
| 208 | WPAFB | 0.750 | 40 gr/ft, HNS/Tin, 0.190 SO, .480 pen, unrestrained | rubber | 0.75 | 0.48 |
| 209 | WPAFB | 0.750 | 40 gr/ft, PBXN5/Lead, 0.200 SO, cut, unrestrained | rubber | 0.75 | cut |
| 210 | WPAFB | 0.750 | 40 gr/ft, PBXN5/Lead, 0.230 SO, cut, unrestrained | rubber | 0.75 | cut |
| 213 | Texstar | Coated In C678, Out C992, ½" | 15 gr/ft, PBXN5/Lead, 90 deg bend, 0.150 SO, cut/0.48 penetration | paper/- | 0.53 | .48/cut |
| 214 | Texstars | Coated In C678, Out C992, ½" | 25 gr/ft, HNS/Tin, 0.150 SO, restrained, −65° F., cut | rubber | 0.54 | cut |
| 215 | Texstars | Coated In C678, Out C992, ½" | 25 gr/ft, HNS/Tin, 0.150 SO, Broke, 0.475 Pen | rubber | 0.54 | 0.475 |
| 216 | Texstars | Coated In C678, Out C992, ½" | 15 gr/ft, PBXN5/Lead, 0.150 SO, 200° F., Unrestrined, Cut | rubber | 0.54 | cut |
| 217 | Texstars | Coated In C678, Out C992, ½" | 15 gr/ft, PBXN5/Lead, 0.150 SO, restrained, cut | rubber | 0.54 | 0.5 |
| 218 | Navy | ½", MX2054-920415 | 20 gr/ft PBXN5/Tin 0.185 SO, 90° bend, 2" R, untethered, cut | rubber | 0.5 | cut |
| 220 | Texstars | ½", Coated In C678, Out C992 | 17.5 gr/ft PBXN5/Tin, 185 SO, 90° bend, 2" R, not cut | rubber | 0.53 | 0.22 |
| 221 | Texstars | 0.740 Laminated, special | 40 gr/ft PBXN5/Lead, 0.200 SO, Cut | rubber | 0.74 | cut |
| 222 | Sierracin | 0.500 Inch | 20 gr/ft, PBXN5/Lead, 0.15 SO, 90° bend, 2" R, 200° F., cut | rubber | 0.5 | cut |
| 223 | Sierracin | 0.500 Inch | 20 gr/ft, PBXN5/Lead, 0.15 SO, 90° bend, 2" R, −65° F. | rubber | 0.5 | cut |
| 224 | Sierracin | 0.500 Inch | 15 gr/ft, PBXN5/Lead, 0.15 SO, untethered, cut | rubber | 0.5 | cut |
| 225 | Sierracin | 0.500 Inch | 15 gr/ft, PBXN5/Lead, 0.15 SO, tethered, cut | rubber | 0.5 | cut |
| 226 | Sierracin | 0.75 inch | 30 gr/ft PBXN5/Lead, 0.15 SO, cut | rubber | 0.75 | cut |
| 228 | Texstars | 0.50 inch | 15 gr/ft PBXN5/Lead, 0.15 SO, 1/2" RTV filled Apex, not cut in RTV area | rubber | 0.5 | not RTV |
| 231 | UDRI | 0.75 inch | 12 gr/ft PBXN5/Tin, 0.100 SO, .285 pen | rubber | 0.765 | 0.285 |
| 232 | UDRI | 0.75 inch | 15 gr/ft PBXN5/Tin, 0.100 SO, .36 pen | rubber | 0.765 | 0.36 |
| 233 | UDRI | 0.75 inch | 15 gr/ft PBXN5/Lead, 0.100 SO, .33 pen | rubber | 0.765 | 0.33 |
| 234 | UDRI | 0.75 inch | 17.5 gr/ft PBXN5/Tin, .100 SO, HMR-T98-1321, .320 pen, cracking thru | rubber | 0.765 | 0.32 |

-continued

| TEST # | SOURCE | IDENTIFICATION INFORMATION | NOTES | Back Up | Thickness | Penetration |
|---|---|---|---|---|---|---|
| 235 | UDRI | 0.75 inch | 17.5 gr/ft PBXN5/Tin, .100 SO, LMR-T98-1323, .32 pen | rubber | 0.765 | 0.32 |
| 236 | UDRI | 0.75 inch | 17.5 gr/ft PBXN5/Lead, .110 SO, HMR-T98-1322, .30 pen | rubber | 0.765 | 0.3 |
| 237 | UDRI | 0.75 inch | 17.5 gr/ft PBXN5/Lead, .110 SO, LMR-T98-1320, .31 pen | rubber | 0.765 | 0.31 |
| 238 | UDRI | 0.75 inch | 20 gr/ft PBXN5/Tin, 0.150 SO, .57 pen | rubber | 0.765 | 0.57 |
| 239 | UDRI | 0.75 inch | 20 gr/ft PBXN5/Lead, 0.110 SO, .4 pen | rubber | 0.765 | 0.4 |
| 240 | UDRI | 0.75 inch | 22.5 gr/ft PBXN5/Tin, .110 SO, HMR-T98-1321, .48 pen | rubber | 0.765 | 0.48 |
| 241 | UDRI | 0.75 inch | 22.5 gr/ft PBXN5/Tin, .110 SO, LMR-T98-1323, .45 pen, 99% broken | rubber | 0.765 | 0.45 |
| 242 | UDRI | 0.75 inch | 22.5 gr/ft PBXN5/Lead, .150 SO, HMR-T98-1322, .58 pen | rubber | 0.765 | 0.58 |
| 243 | UDRI | 0.75 inch | 22.5 gr/ft PBXN5/Lead, .100 SO, LMR-T98-1320, .37 pen | rubber | 0.765 | 0.37 |
| 244 | UDRI | 0.75 inch | 25 gr/ft PBXN-5/Tin, 0.190 SO, .6 pen, cut | rubber | 0.765 | cut |
| 245 | UDRI | 0.75 inch | 25 gr/ft PBXN-5/Lead, 0.190 SO, .6 pen | rubber | 0.765 | 0.6 |
| 246 | UDRI | 0.75 inch | 30 gr/ft PBXN5/Tin, 0.190 SO, .60 pen, cut | rubber | 0.765 | cut |
| 247 | UDRI | 0.75 inch | 30 gr/ft PBXN5/Lead, 0.150 SO, 0.69 pen | rubber | 0.765 | 0.69 |
| 248 | UDRI | 0.75 inch | 40 gr/ft PBXN5/Tin, 0.200 SO, cut | rubber | 0.765 | cut |
| 249 | UDRI | 0.75 inch | 40 gr/ft PBXN5/Lead, 0.200 SO, Cut | rubber | 0.765 | cut |
| 250 | Navy | D910108-08 | 20 gr/ft PBXN5/Lead, 0.150 SO, 1/2" RTV Block, no cut under RTV | rubber | 0.53 | 0.5 |
| 251 | Texstars | 0.375 inch | 15 gr/ft PBXN5/Tin, 0.15 SO, 360° turn butt up with angle cut | rubber | 0.375 | not at joint |
| 252 | Texstars | 0.375 inch | 15 gr/ft PBXN5/Tin, 0.15 SO, 360° turn with overlap | rubber | 0.375 | cut |
| 253 | | 0.75 inch | 25 gr/ft PBXN5/Tin, 0.190 SO, partial cut then broke | rubber | 0.75 | cut |
| 254 | | 0.75 inch | 30 gr/ft PBXN5/Tin, 0.190 SO, bent 120° but hanging. | rubber | 0.75 | cut- |
| 255 | | 0.75 inch | 40 gr/ft PBXN5/Tin, 0.200 SO, 360° turn with overlap, broke, but not a nice clean cut | rubber | 0.75 | cut |
| 256 | Navy | D910108-08 | 15 gr/ft PBXN5/Tin, .150 SO, 360° turn with overlap, 0.40 pen, cut overlap lsc off | rubber | 0.53 | 0.4 |
| 257 | Navy | D910108-08 | 20 gr/ft PBXN5/Lead, .180 SO, 360° turn with overlap, some pen. But most 0.40+ | rubber | 0.53 | 0.4 |
| 258 | Navy | D910108-08 | 25 gr/ft PBXN5/Lead, .180 SO, 360° turn with overlap, mostly cut except overlap | rubber | 0.53 | cut |
| 259 | Navy | D910108-08 | 15 gr/ft PBXN5/Tin, 150 SO, 360° turn with overlap, broke but only 0.37 pen. | rubber | 0.53 | 0.37 |
| 260 | Navy | D910108-08 | 15 gr/ft PBXN5/Tin, 150 SO, 360° turn with piggyback overlap, .36 pen. | rubber | 0.53 | 0.36 |
| 261 | Navy | D910108-08 | 20 gr/ft PBXN5/Lead, .150 SO, 360° turn with piggy-back overlap., did not cut overlap | rubber | 0.53 | cut/not over |
| 262 | Navy | D910108-08 | 25 gr/ft PBXN5/Lead, .150 SO, 360° turn with piggy-back overlap, did not cut overlap | rubber | 0.53 | cut/not over |
| 263 | Navy | D910108-08 | 20 gr/ft PBXN5/Tin, Cross over, .150 SO. cut bottom LSC without detonating | rubber | 0.53 | cut/not over |
| 264 | | .500 inch | 15 gr/ft PBXN5/Tin, loop with mitered joint, .150 SO, did not cut | rubber | 0.5 | 0.3 |
| 265 | | .500 inch | 15 gr/ft PBXN5/Tin, loop with mitered joint, .150 SO, did not cut | rubber | 0.5 | 0.3 |
| 266 | | .500 inch | 25 gr/ft PBXN5/Tin, "D" shape with mitered corners, .150 SO, Cut nicely | rubber | 0.5 | cut |
| 270 | Sierracin | 1.00 inch, 7 ply laminate | 40 gr/ft PBXN5/Tin, 90° mitered angle, .180 SO, cut nicely | rubber | 1 | cut |
| 271 | Texstars | .375 Coated. | 12 gr/ft PBXN5/Tin, 0.070 SO, .300 pen | rubber | 0.375 | 0.3 |
| 272 | Sierracin | .500 Laminated | 12 gr/ft PBXN5/Tin, .070 SO, cut | rubber | 0.5 | cut |
| 273 | Sierracin | .500 Laminated | 15 gr/ft PBXN5/Tin, .070 SO, .360 pen | rubber | 0.5 | 0.36 |
| 274 | Navy | .500 cast | 25 gr/ft PBXN5/Tin, .150 SO, "O" with T Mitered, Cut | rubber | 0.5 | cut |
| 278 | Sierracin | Laminated .448 | 12 gr/ft PBXN5/Tin, .070 SO, 90° bend, cut | rubber | 0.448 | cut |
| 279 | Sierracin | .448 Laminated | 12 gr/ft PBXN5/Tin, .070 SO, 90° bend, cut | rubber | 0.448 | cut |
| 280 | Sierracin | .525 Laminated | 15 gr/ft PBXN5/Tin, .150 SO, 90° bend, nearly completely severed | rubber | 0.525 | 99% cut |
| 281 | Sierracin | .525 Laminated | 12 gr/ft PBXN5/Tin, .150 SO, 200° F., 90° bend, did not cut | rubber | 0.525 | 0.36 |
| 282 | Sierracin | .525 Laminated | 15 gr/ft PBXN5/Tin, .150 SO, 200° F., 90° bend, cut | rubber | 0.525 | cut |
| 283 | Sierracin | .448 Laminated | 12 gr/ft PBXN5/Tin, .070 SO, 200° F., 90° bend, cut | rubber | 0.448 | cut |

Previous methods of aircraft canopy fracturing and severance relied on the use of shock waves generated from an explosive charge. In order to facilitate shock wave transfer from the explosive charge to the target, U.S. Pat. No. 5,170,004 taught the use of a nearly incompressible medium placed between the charge and target. While this method is effective on acrylic and other fragilizing type materials, it is not reliable with polycarbonate, polycarbonate laminate or acrylic/polycarbonate laminates. With polycarbonate type materials, the use of an incompressible or other medium between the LSC and the target degrades rather than improves results. This is because polycarbonates are not easily fractured and therefore cutting using the explosive "jet" blast of the LSC is preferable to fracturing using shock waves. Because severance is preferable to fracturing, it is important that the area between the LSC and the target be clear of debris. This goes against the teaching of the 004 patent which taught the use of some form of nearly incompressible medium between the charge and the target in order to facilitate transmission of shock waves.

U.S. Pat. No. 5,780,763 taught a method of fracture wherein explosive charges are placed in parallel grooves cut in the upper surface of the material and simultaneously detonated to create overlapping shock waves. Again, because this method relies on shock waves which are unreliable to sever polycarbonate materials it is inferior to the present invention that uses the unimpeded explosive "jet" blast of the LSC to sever the material.

As revealed by the test results set forth above, the best severance results are obtained by use of a rubber back up, a PBXN-5 powder and a lead or tin sheath. Ideal set off was in the range of 0.100 to 0.300 inch for coreloads of 12 to 40 grains per foot.

Figure 4:
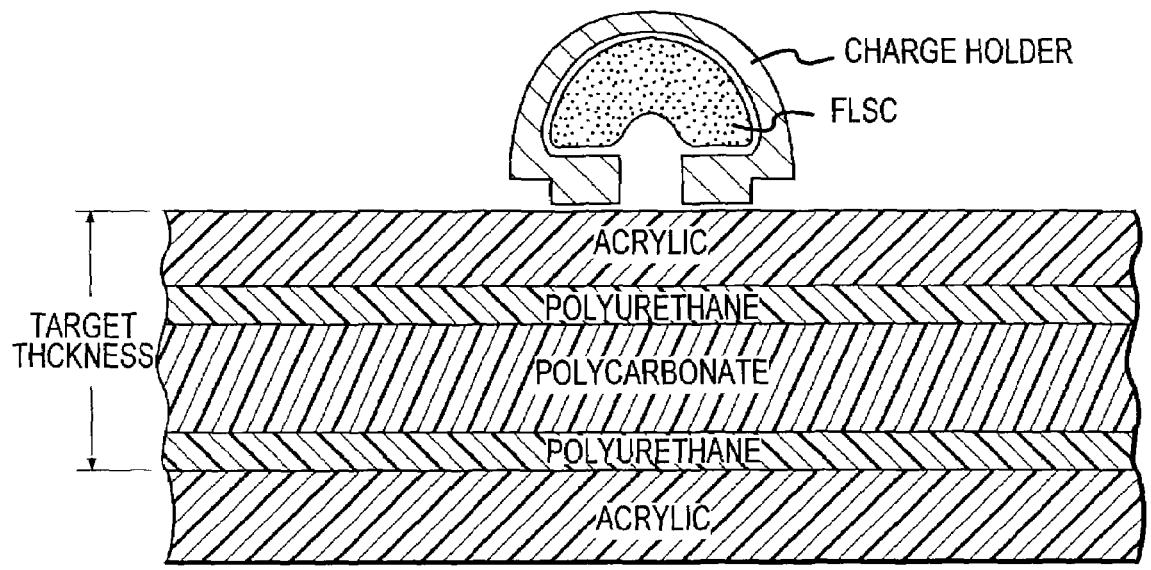
FIG. 4 is a depiction of a polycarbonate laminate and its target thickness.

Laminates of polycarbonate, acrylic, stretched acrylic and polyurethane can be severed with less overall energy than pure polycarbonate. The target thickness for the laminate is the total thickness from the LSC side through the final layer of polycarbonate or polyurethane. FIG. 4 shows the target thickness of a laminate. Any acrylic outside the final polycarbonate or polyurethane layer is easily shattered by the shock wave created by the LSC severing the polycarbonate. Acrylic layers between the LSC and the final layer or polycarbonate or polyurethane will act very much like the polycarbonate for the entire thickness.

Another shortcoming in the prior art was difficulty in safely severing polycarbonates and other materials around corners. To create a passageway for an ejecting or egressing aircrew it is necessary that the LSC circumscribe some pattern sufficient to allow egress. Severance problems arise when the LSC is bent around the corners of this pattern. These problems are attributable to at least two factors. First, in bending the LSC the coreload may be disbursed to less than an optimum strength, especially on the outside of the bend. Second, when the LSC and its retainer are bent around corners, the open end of the chevron may be shifted from parallel to the target surface. Optimal results are achieved when the open end of the chevron is parallel to the target surface and the explosive force is therefore perpendicular to that surface. Any alteration from parallel lessens the explosive force striking the target and impedes severance.

Therefore, in a preferred embodiment of this invention, bends in the LSC are gentle, with turn radii kept on the order of 2 inches or above. In this way the coreload of the LSC is kept consistent. Additionally, both the LSC and its retainer are tooled so as to keep the open end of the LSC chevron parallel to, and the apex of the chevron and resulting explosive force perpendicular to, the target. Through these methods, the full force of the explosive charge is expended directly on and perpendicular to the target. This allows severance with a minimum of coreload, thereby reducing noise and back blast.

Figure 5:
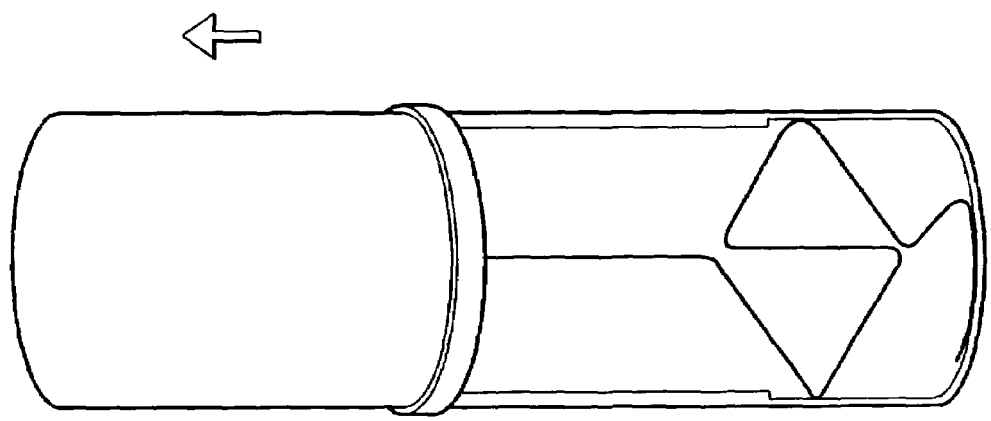
FIG. 5 is a depiction of a severance pattern disclosed in U.S. Pat. No. 5,954,296.

The LSC must be placed on the target in a pattern that will effect severance of a portion of the target. In the prior art the LSC was not able to crossover another length of LSC. Instead the LSC would be bent around as it approached another length of LSC. FIG. 5 is a depiction of a LSC pattern on the severable portion of an aircraft canopy, as disclosed in the 296 patent discussed above. In FIG. 5 it can be seen that the charges must turn at sharp bends where it would be simpler, require less LSC and tooling, and avoid the degradation in performance associated with sharp bends if a length of LSC could simply intersect or crossover another length. This invention effects such intersections and crossovers in several ways.

Figure 6:
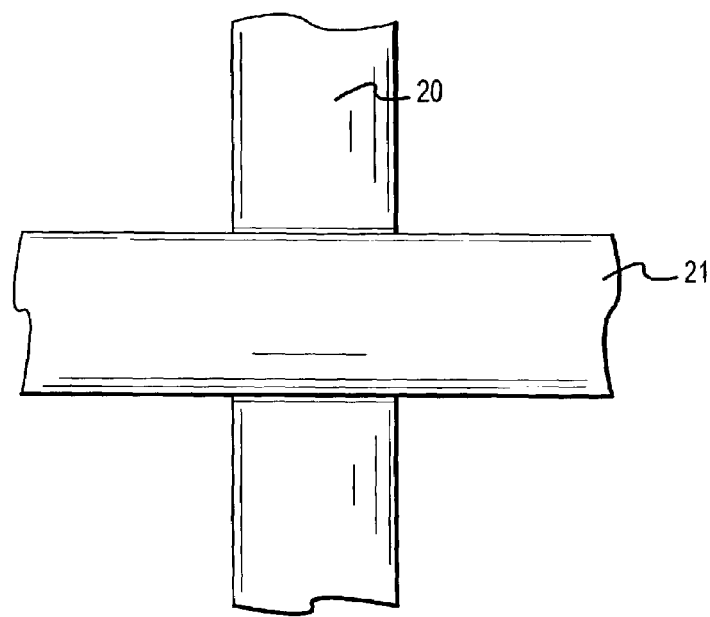
FIG. 6 is a depiction of the crossover method of laying one LSC over another.

FIG. 6 depicts one crossover method. A first length of LSC 20 is first run along the target. A second length of LSC 21, intersecting the first length, can then be run over the top of the first length. When a crossover method is utilized the second length of LSC must be detonated before the first. If the first length of LSC is detonated before the second length it will blow the second length off the target and greatly impede the severance capability of the second length of LSC. Additionally, the crossover must be designed so that upon detonation, the second length of LSC detonates the first length of LSC. If the second length of LSC merely severs the first length, without detonating it, the severing capability of the LSC will be again greatly reduced.

Figure 6A:
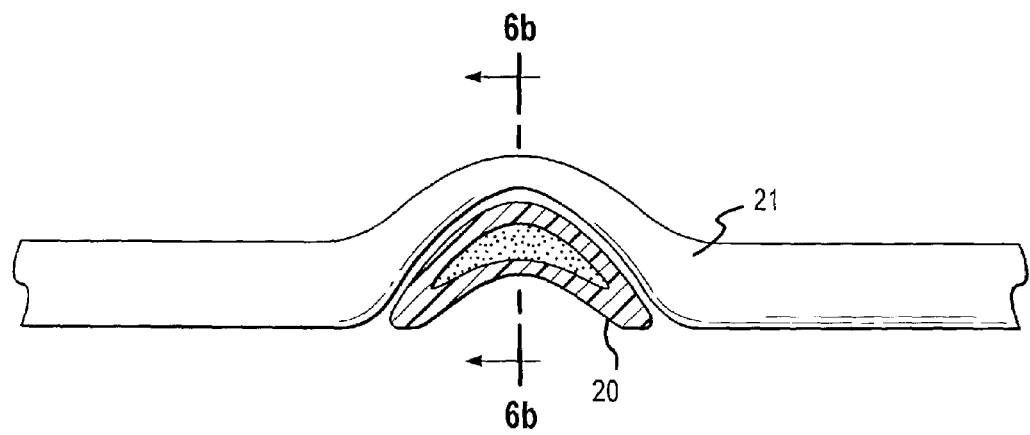
FIG. 6a is a depiction of a side view of the crossover method.
Figure 6B:
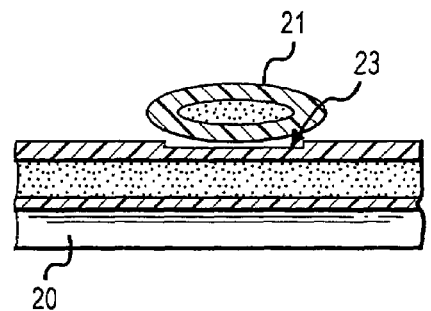
FIG. 6b is a depiction of a side view of the crossover method where a portion of the sheathing on the lower length of LSC has been cut away.

FIG. 6a shows the second length of LSC 21 flattened over the first length of LSC 20. By flattening the second length of LSC 21 its cutting force is reduced and it will detonate, instead of sever, the first length of LSC 20. It may also be desirable to cut away some of the metal sheathing on the top of the first length of LSC 20 to assist detonation by reducing the amount of metal sheathing that the second length of LSC 21 must to detonate through in order to detonate the first length of LSC 20. FIG. 6b shows the crossover method wherein the first length of LSC 20 has part of its metal sheathing cut away indicated by numeral 23 to facilitate its detonation by the second length of LSC 21. This may be especially important in higher coreload material.

Figure 6C:
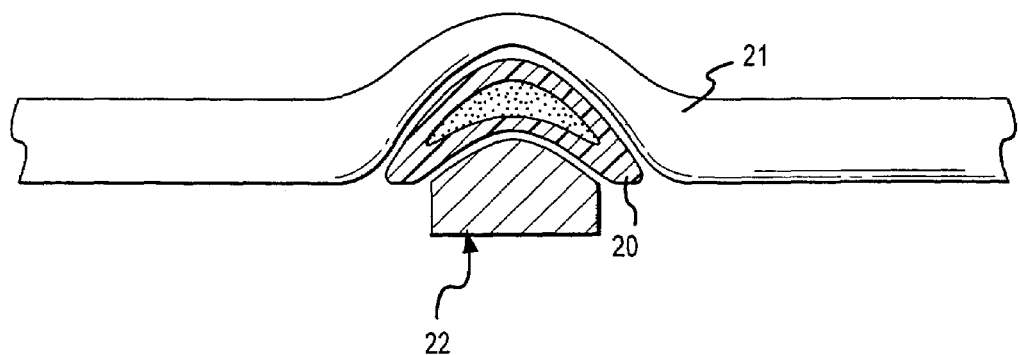
FIG. 6c is a depiction of a side view of the crossover method where a solid anvil is placed under the lower length of LSC to aid in detonation transfer.

Another method of ensuring detonation of the first length of LSC by the second length is to insert a solid material under the first length of LSC so that upon detonation of the second length of LSC the first length is forced against the solid material to assist in detonation transfer. FIG. 6c shows a solid anvil type object 22 placed under the first length of LSC 20. The anvil adds reliability to the detonation transfer, especially with higher coreload LSC severance.

Figures 7, 7A:
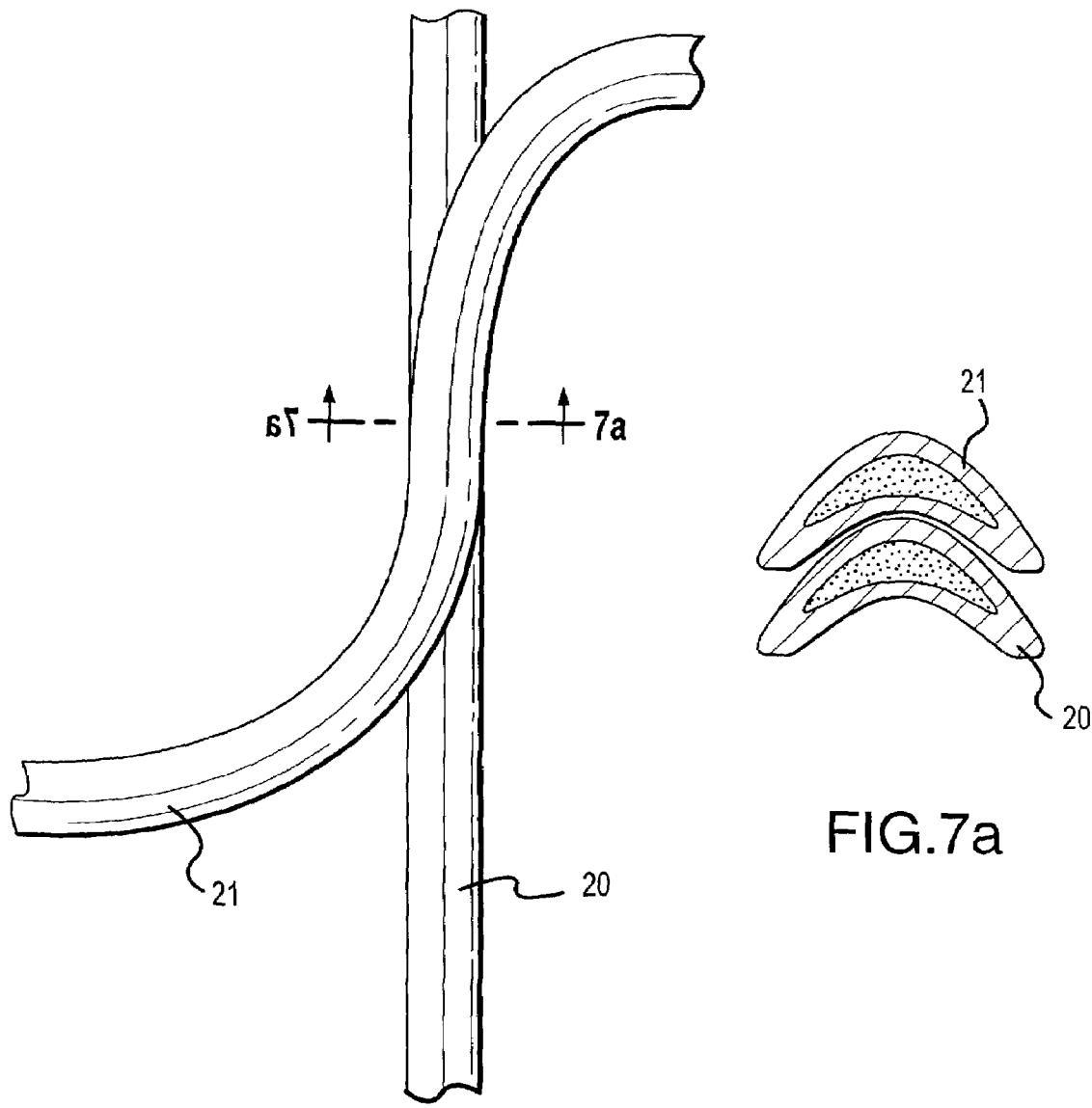
FIG. 7 is a depiction of the invention's method of piggybacking where one LSC comes up over a lower piece of LSC and rides the same line of severance for a given distance.
FIG. 7a is a side view of the piggyback method.

A variation on the crossover method is shown in FIG. 7. In this method the second length of LSC 21 comes up on the first length of LSC 20 and rides the same line of severance for some given distance. This crossover method (referred to as a piggyback) not only avoids the sharp bend problem, it can also be used to add to the cutting capability of the first length of LSC and should be considered in areas of the target material that are thicker than other areas. In the piggyback method it is also important to fire the second length of LSC first. Firing the first length (the length closest to the target) first could result in blowing the second length off the target. FIG. 7a shows a side view of the piggy back method.

Figure 8:
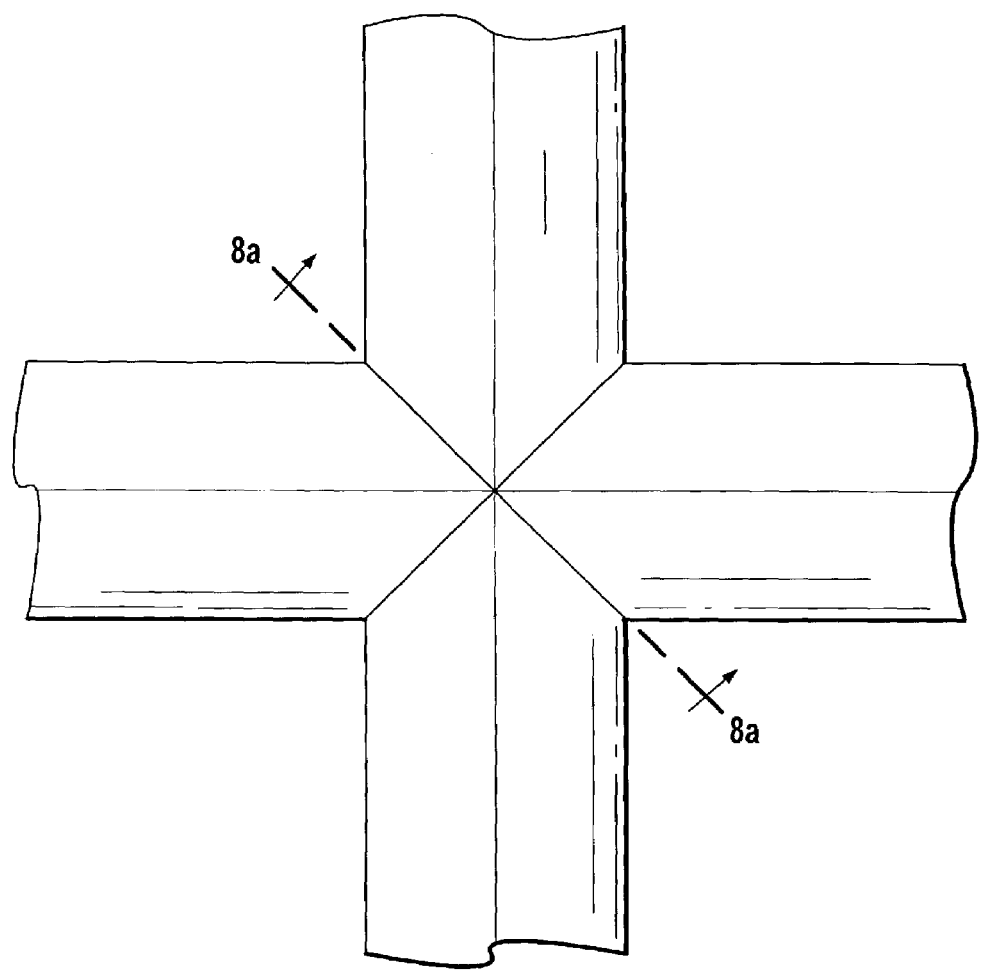
FIG. 8 is a depiction of the mitered joint method with four intersecting pieces of LSC.
Figure 8A:
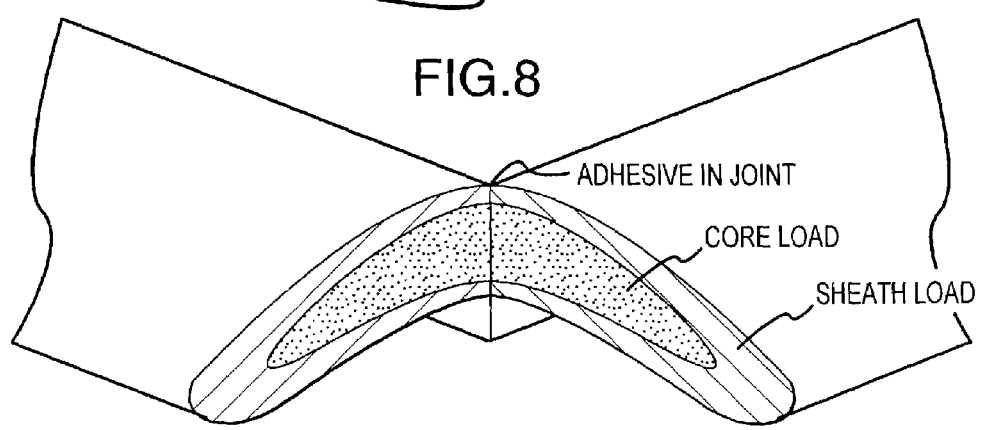
FIG. 8a is a side view of the miter method.
Figure 9:
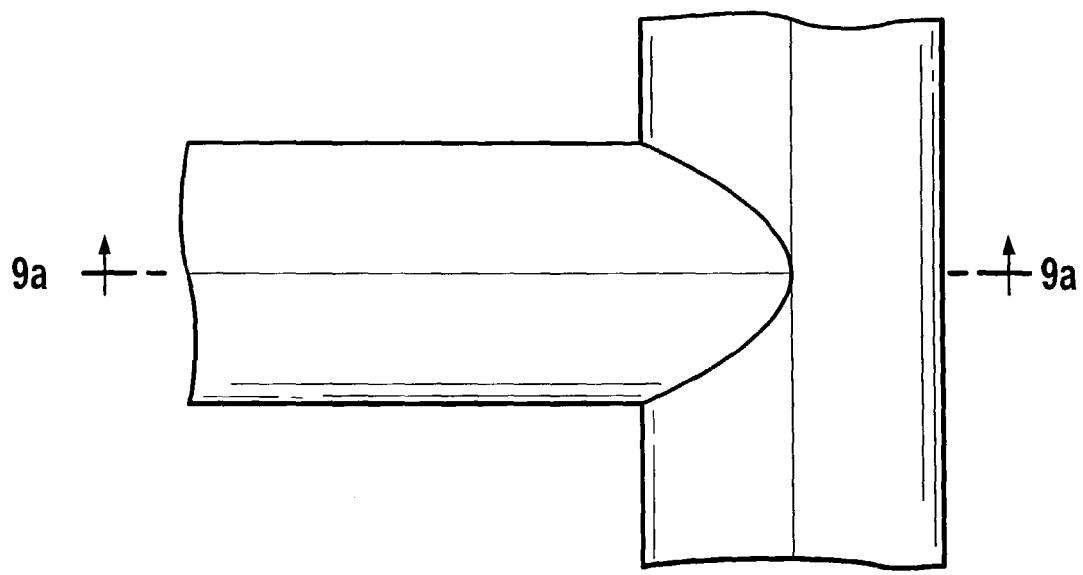
FIG. 9 is a depiction of the miter method joining two lengths of LSD at a right angle.
Figure 9A:
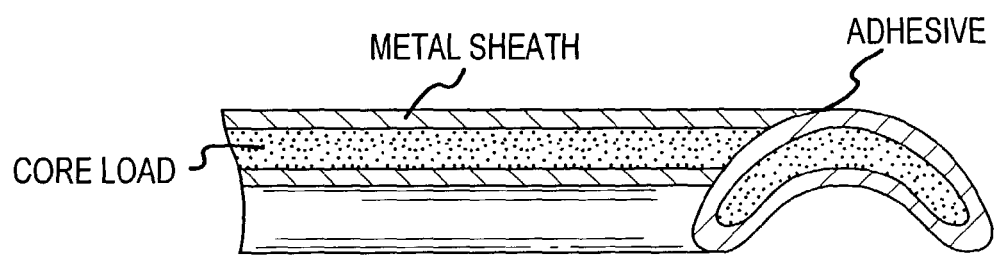
FIG. 9a is a side view of the miter method used at a right angle.

An additional method of routing LSC through intersections in a pattern is the mitered joint. FIG. 8 shows a four way mitered joint. The LSC is cut on the appropriate angle (i.e. 45°) to meet with another end of LSC that is similarly mitered. The joint is then joined with an adhesive. Appropriate adhesives include C-7/W and 5-minute epoxy. FIG. 8a depicts a crossview of the four way mitered joint. FIG. 9 shows a method of joining two lengths of LSC at a right angle. As with the crossover method, if one mitered joint is to ride over another it is important that the LSC closest to the target is not detonated until after the other length of LSC.

Figure 10:
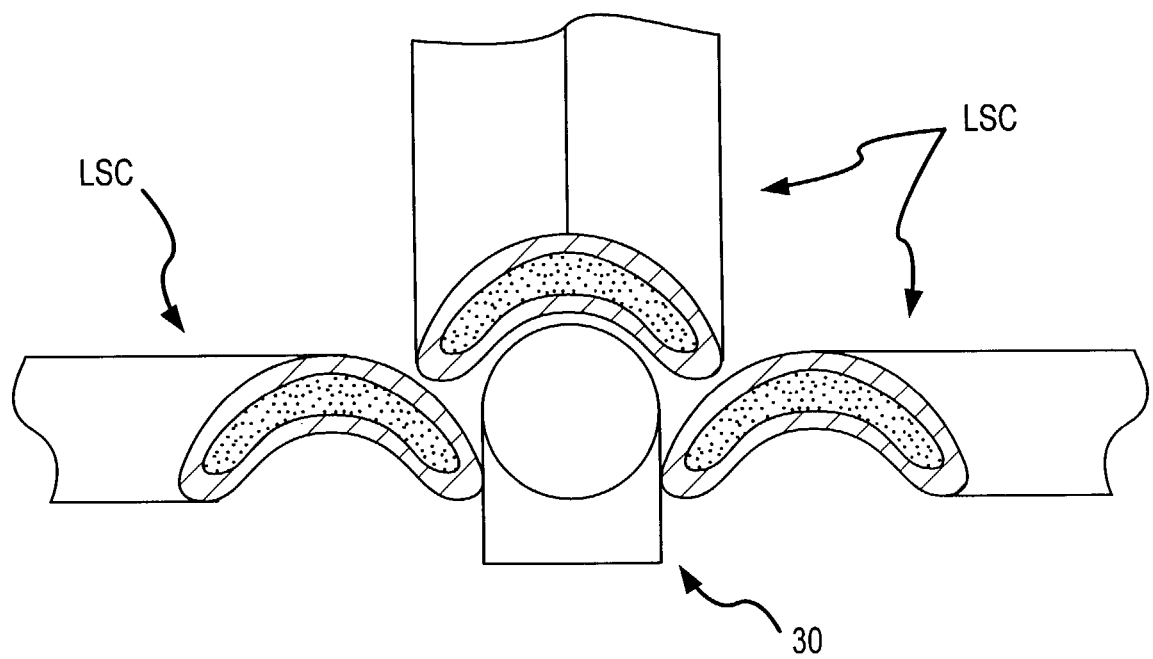
FIG. 10 is a depiction of transferring LSC detonation through a crossover or intersection in the LSC utilizing a booster charge.
Figure 11:
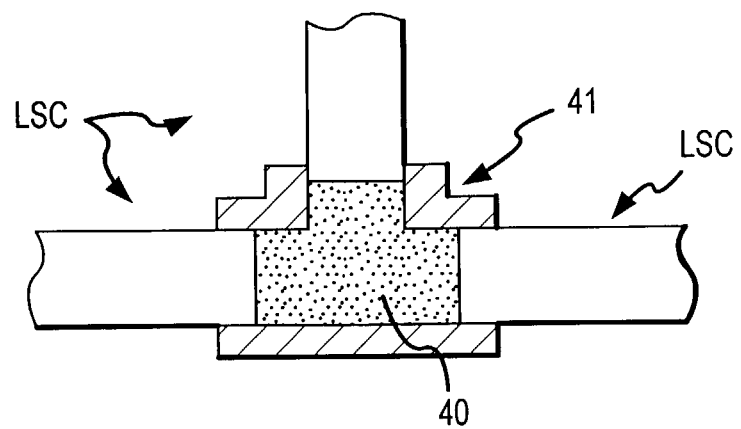
FIG. 11 is a depiction of transferring LSC detonation through a crossover or intersection in the LSC utilizing an explosive transfer charge encased in a manifold.

FIG. 10 shows another method of LSC intersection. In FIG. 10, a booster charge 30 is placed at the intersection of the adjoining lengths of LSC. The lengths of LSC abut to the booster charge that transfers detonation through the intersection. While booster charges have been used to transfer detonation in other mediums, they have not been utilized with LSC. FIG. 11 shows an LSC intersection where an explosive transfer charge powder 40, typically FINS or PBNX-5, is enclosed in a manifold 41 that assists in transferring detonation. These methods do not provide for cutting under the booster or transfer charge but can provide for breaking at that point. Additionally, the manifold method is limited in use because the manifold becomes a projectile upon detonation if not retained. Therefore, in the case of aircraft transparency severance, the manifold method is limited to use on the sill of the aircraft, where it can be retained by a retainer mounted over the LSC and held to the aircraft's fuselage.

The retainer is not shown in the intersection figures, but those skilled in the art will recognize that a charge holder can be designed to take account of the LSC intersection or crossover.

The severance method of the present invention may be utilized in a system designed so as to be seated proximal to a sill portion of the aircraft and the system may include, in addition to the above-described arrangement for freeing a severable region of the canopy, one or more explosive charge positioned on or in close proximity to at least a portion of the sill and that will, on detonation, free substantially the entire transparent portion of the canopy from the aircraft. The present system also may be designed so as to selectively initiate either the detonation of the explosive charges mounted on or near the sill so as to sever substantially the entire transparent portion of the canopy or the severance of the smaller, severable region of the canopy. Detonation of the explosive charges mounted on or near the sill may be preferred over severing the severable region of the canopy in situations where the aircraft is on the ground or is otherwise not in flight and immediate egress from the cockpit is necessary.

The present severance method may also be designed so that the one or more explosive charges mounted on or near the sill detonate and free a large portion of the canopy from the aircraft simultaneous with the fracturing of the smaller, severable region to allow egress from the aircraft. Alternately, the present severance method may be used in a system to provide for the detonation of the one or more explosive charges mounted on or near the sill after the fracturing and severance of the smaller, severable region.

Various other details of the design and implementation of aircraft canopy fracturing systems will be apparent to those of ordinary skill in the art and, therefore, are not provided herein. Such details are in part provided in, for example, "A Systems Engineering Design Guide to Aircraft Explosive Canopy Fracturing", December 1993, Teledyne Ryan Aeronautical, McCormick Selph Ordinance, the entire content of which is incorporated herein by reference.

Those of ordinary skill in the art also will appreciate that various changes in the details and arrangements of parts and materials which have been herein described and illustrated in order to teach the nature of the invention may be made by those skilled in the art. Any such modifications remain within the principle and scope of the invention as expressed in its claims.

What is claimed is:

1. A method of severing a pattern of a canopy, comprising the steps of:
   placing a first linear shaped charge along the pattern in proximity to a region comprised of a material comprising a polycarbonate or a laminate including polycarbonate;
   placing a second linear shaped charge over said first linear shaped charge in such a way that said first linear shaped charge runs over said second linear shaped charge; and
   detonating said second linear shaped charge so that said first linear shaped charge is detonated to sever the pattern from the region.

2. The method of claim 1, wherein said first linear shaped charge comprises a first sheath and a first coreload retained in said first sheath, said second linear shaped charge comprises a second sheath and a second coreload retained in said second sheath, and said second sheath being placed to intersect said first sheath.

3. The method of claim 2, wherein the intersecting portion of said second sheath is flattened.

4. The method of claim 2, wherein a portion of said first sheath forming an intersection with said second sheath is cut away.

5. The method of claim 2, further comprising the step of:
   placing a solid material between said region and an intersection of said first sheath and said second sheath.

6. The method of claim 1, wherein said second linear shaped charge overlaps with said first linear shaped charge.

7. A canopy severing system, comprising:
   a first linear shaped charge placed in proximity to a region of a canopy comprised of a material comprising a polycarbonate or a laminate including a polycarbonate to be severed; and
   a second linear shaped charge running over said first linear shaped charge in such a way that upon a detonation of said second linear shaped charge, said first linear shaped charge is detonated.

8. The canopy severing system of claim 7, wherein said first linear shaped charge comprises a first sheath and a first coreload retained in said first sheath, said second linear shaped charge comprises a second sheath and a second coreload retained in said second sheath, and said second sheath is placed with said first sheath intersecting with said second sheath.

9. The canopy severing system of claim 8, wherein a portion of said second sheath intersecting said first sheath is flattened.

10. The canopy severing system of claim 8, wherein a portion of said first sheath intersecting said second sheath is cut away.

11. The canopy severing system of claim 8, further comprising:
    a solid material placed between a portion of said first sheath intersecting said second sheath and the region of the canopy.

12. The canopy severing system of claim 7, wherein said second linear shaped charge overlaps with said first linear shaped charge.

13. An explosively operated canopy severing system, comprising:
    a first linear shaped charge positionable in proximity to a region of a canopy comprised of a material comprising a polycarbonate or a laminate including a polycarbonate to be severed, said first linear shaped charge comprising a first sheath and a first coreload retained within said first sheath spaced-apart from the region; and a second linear shaped charge comprising a second sheath overlying a section of said first linear shaped charge and a second coreload retained within said second sheath disposed to initiate detonation of said first linear shaped charge.

14. The canopy severing system of claim 12, further comprising:

a booster charge disposed between said section and the region.

15. An aircraft canopy, comprising:

a transparent material comprising a polycarbonate or a laminate including polycarbonate, said transparent material having a pattern to be severed, said pattern having an intersection where lines of the pattern cross; and a linear explosive charge comprising a sheath and a coreload retained in said sheath, said sheath attached to said transparent material along said pattern with an open space to provide an offset between said linear explosive charge and said transparent material.

16. The aircraft canopy of claim 15, further comprising: a booster charge mounted at said intersection of said pattern, adjoining lengths of said linear explosive charge abutting to said booster charge, and said booster charge transferring detonation through said intersection.

17. The aircraft canopy of claim 15, further comprising: an explosive transfer charge;

a manifold enclosing said explosive charge, said manifold mounted at said intersection of said pattern.

18. The aircraft canopy of claim 15, further comprising: a plurality of linear explosive charges having mitered ends, said mitered ends connected to each other at said intersection.

19. An aircraft canopy, comprising:

a transparent material comprising a polycarbonate or a laminate including polycarbonate, said transparent material having a region to be severed;

a first linear shaped charge placed in proximity to said region to be severed, said first linear shaped charge comprising a first sheath and a first coreload retained in said first sheath; and a second linear shaped charge comprising a second sheath and a second coreload retained in said second sheath, said second linear shaped charge running over said first linear shaped charge in such a way that upon a detonation of said second linear shaped charge, said first linear shaped charge is detonated so that said region is severed from said aircraft canopy.

20. The aircraft canopy of claim 19, wherein a portion of said second sheath intersecting said first sheath is flattened.

21. The aircraft canopy of claim 19, wherein a portion of said first sheath intersecting said second sheath is cut away.

22. The aircraft canopy of claim 19, further comprising: solid material placed between a portion of said first sheath intersecting said second sheath and the transparent material.

23. The aircraft canopy of claim 19, wherein said second sheath longitudinally overlaps with said first sheath.

24. The system of claim 13, comprised of said first linear shaped charge and said second linear shaped charge each exhibiting widths that are substantially less than a length of said section.

25. The system of claim 13, comprised of said first linear shaped charge and said second linear shaped charge each exhibiting widths that are substantially equal to a length of said section.

26. The system of claim 13, comprised of a portion of one of said first sheath and said second sheath exhibiting a reduced thickness within said section.

27. The system of claim 13, comprised of a solid material interposable at said section between said first linear shaped charge and the region.

28. An explosively-operated canopy severing process, comprising:

positioning a first linear shaped charge in proximity to a region of a canopy comprised of a material comprising a polycarbonate or a laminate including a polycarbonate to be severed, with said first linear shaped charge comprising a first sheath and a first coreload retained within said first sheath spaced-apart from the region; and positioning a second linear shaped charge comprising a second sheath to overlie a section of said first linear shaped charge and a second coreload retained within said second sheath in a disposition to initiate detonation of said first linear shaped charge.

29. The process of claim 28, comprised of disposing a booster charge between said section and the region.

30. The process of claim 28, comprised of positioning said first linear shaped charge and said second linear shaped charge to each exhibit widths that are substantially less than a length of said section.

31. The process of claim 28, comprised of positioning said first linear shaped charge and said second linear shaped charge to each exhibit widths that are substantially equal to a length of said section.

32. The process of claim 28, comprised of altering a portion of one of said first sheath and said second sheath to exhibit a reduced thickness within said section.

33. The process of claim 28, comprised of interposing a solid material at said section between said first linear shaped charge and the region.

* * * * *